March 25, 1941.  H. F. KOLB  2,236,247

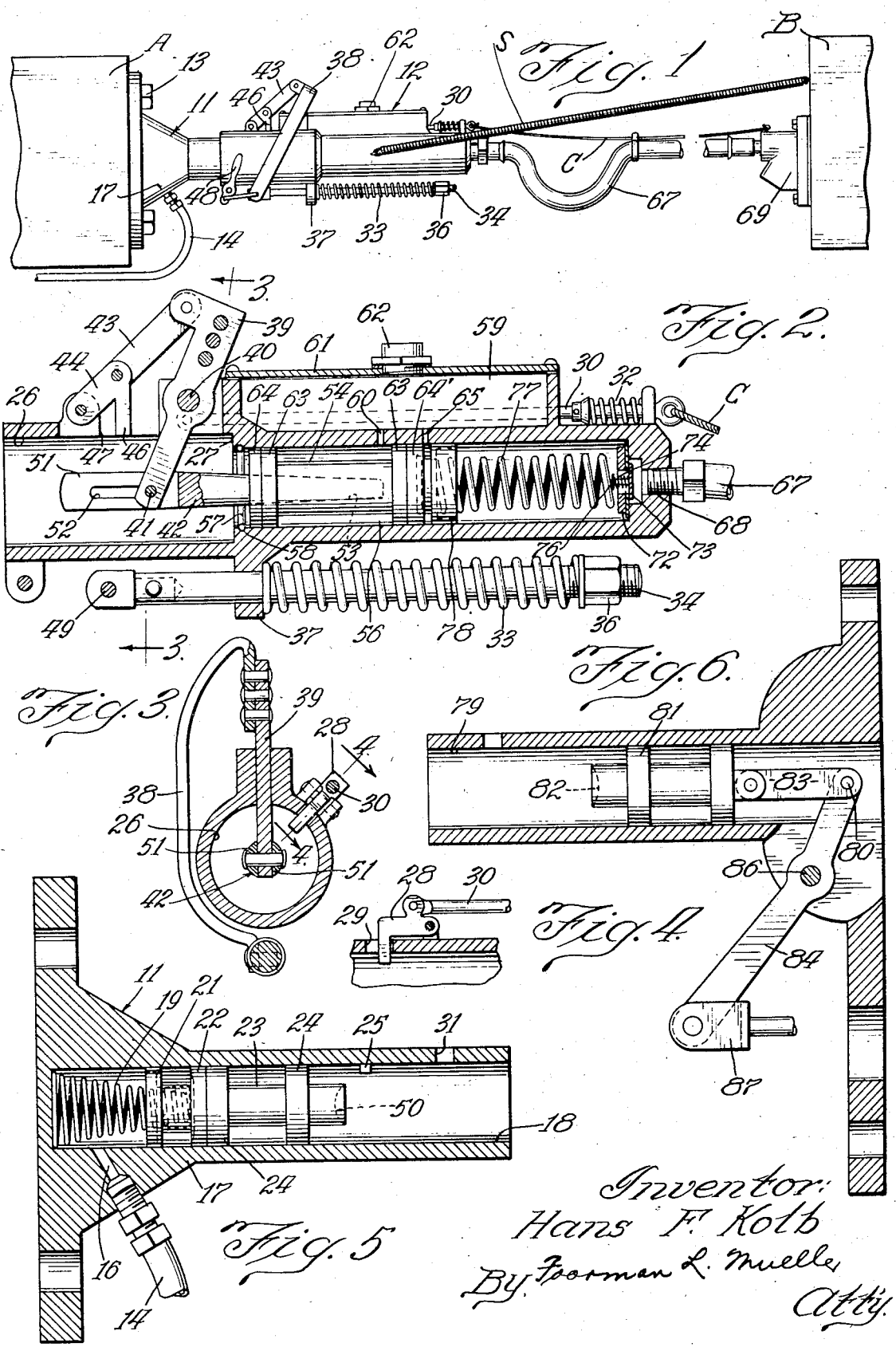

BRAKE MECHANISM

Filed July 14, 1939  2 Sheets-Sheet 2

Inventor:
Hans F. Kolb
By: Foorman L. Mueller
Atty.

Patented Mar. 25, 1941

2,236,247

UNITED STATES PATENT OFFICE 2,236,247

BRAKE MECHANISM

Hans F. Kolb, Chicago, Ill.

Application July 14, 1939, Serial No. 284,428

12 Claims. (Cl. 188—3)

My invention relates in general to brake couplings for moving vehicles, and more particularly to mechanism for coupling together the brake systems of connected units such as a tractor and trailers, cars in a railroad train, and the like.

Since the comparatively recent advent of motorized freighting on a large scale it has been found desirable to employ trucks having a large capacity both for large volume hauling, and economical storage in terminals and the like. In order to speed up transportation and yet hold down the overhead to a minimum, tractor-trailer combinations have been employed, with one tractor being used for several trailers. It has been a problem of grave concern to the manufacturers of such combinations to provide adequate braking systems which may be operated from the tractor. It is mandatory in many states to provide these tractor-trailer combinations with some type of an automatic braking system which will stop the trailer if it should be uncoupled from the tractor while moving. There have been many attempts to solve this problem, but prior to my invention, there has been little success in providing a substantially infallible automatic braking system. When air brakes are employed in the trailer they become useless when separated from the tractor, since they depend on the tractor motor for their operating power. Vacuum brakes likewise depend on the motor in the tractor for their power so that when they are used in the trailers they are rendered useless through the uncoupling of the tractor and trailers. Electric brakes have been used to some extent, but the coil in such apparatus becomes overheated in a short time upon application of the brakes and it thereby loses its magnetic quality to such an extent that the brakes can be applied for only a short time. It is important in providing an automatic braking system for the trailer when it is uncoupled from the tractor for loading, unloading, storage, or the like, to have a system that will hold the trailer for an indefinite period of time. It is obvious that the above-mentioned systems, when employed in a trailer would fail to provide such braking upon being uncoupled from the tractor. In fact, under such conditions it is now normally necessary to put blocks under the wheels of the trailer to prevent it from moving. This is not satisfactory under any conditions and, of course, would not be possible if a trailer became uncoupled from the tractor when in transit, and the failure of brakes under such circumstances is an extremely serious matter.

Another problem in tractor and trailer trains particularly, is the elimination of "jack-knifing" between the units in the train. Many of the braking systems now employed in tractor-trailer combinations provide difficulties since they are duo-systems which often necessitate a separate lever for each system. If the brakes on the tractor unit are applied before the brakes on the trailer unit, the momentum of the trailer is apt to be such that it would cause the combination to "jack-knife" and thereby causing considerable damage to the train. This trouble has been alleviated to some extent by providing a single lever to actuate the individual levers of the two braking systems, but even this improvement has not sufficiently solved the problem.

An object of my invention is to provide an improved brake system for a multi-unit vehicle train.

Another object of my invention is to provide improved means for coupling together and operating two independent braking systems for moving vehicle trains.

It is also an object of my invention to provide a brake coupling for a tractor-trailer combination which will transmit braking movement from the tractor to the trailer without the actual transmission of air, fluid, or electricity from one to the other, assuming the brake system of one, or the other, or both units, uses such medium.

Another object is to provide means for automatically operating and setting brakes in a following unit of a multiple unit train in the event the following unit becomes disconnected from the pulling unit. In this connection, one of the features of my invention is the provision of means which will prevent coupling of the brake units until the means for accomplishing the automatic operation is set.

A further object of my invention is to provide a brake coupling which may be used to couple two different braking systems on a moving vehicle thereby incorporating them into a single system.

A still further object is to provide a brake coupling to couple the braking systems in two separable units which is adaptable to hydraulic brakes but does not transmit fluid from one unit to the other so that the braking systems in each may act independently of the other.

Further objects and advantages of my invention will be apparent from the following detailed description taken with the drawings, in which:

Fig. 1 is a side view of one embodiment of my invention to be used when both the tractor and trailer braking systems are hydraulic.

Fig. 2 is an enlarged longitudinal sectional view of the female portion of the structure of Fig. 1.

Fig. 3 is a cross-sectional view taken along the line 3—3 of Fig. 2.

Fig. 4 is a fragmentary detail view of the locking pin, taken along the line 4—4 of Fig. 3.

Fig. 5 is an enlarged longitudinal sectional view of the male member of the structure of Fig. 1.

Fig. 6 is a longitudinal sectional view of a modification of the male portion of my invention illustrated in a position 180° from that of Fig. 5. This structure can be employed when the tractor is provided with a vacuum, or a mechanical brake system.

Figure 7:
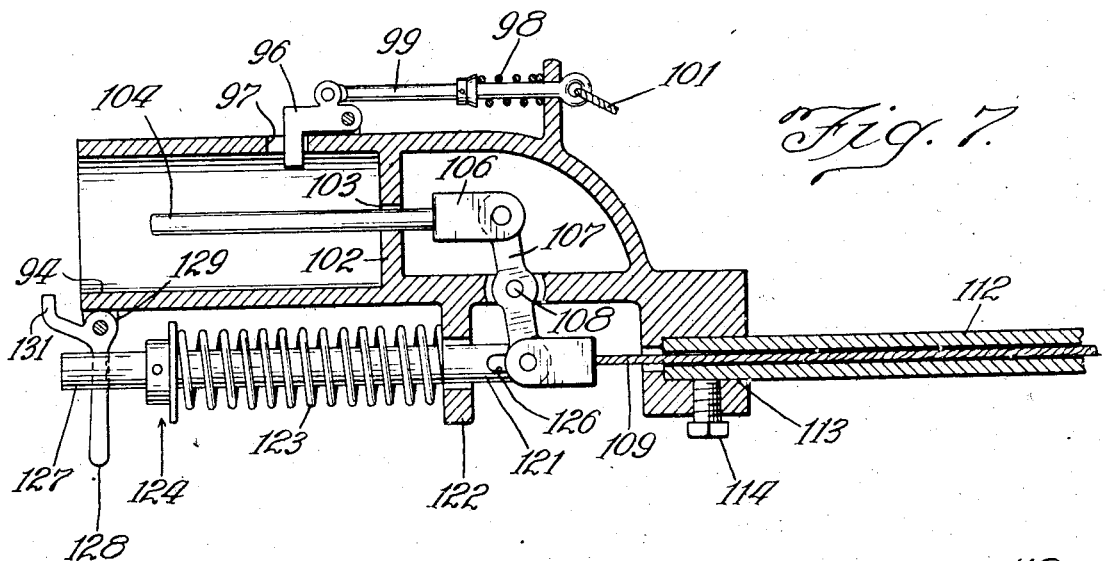
Fig. 7 is a longitudinal sectional view of a modification of the female member of the structure of Fig. 1.

In practicing my invention, I provide a brake coupling comprising a pair of separable members, which for convenience will be called a male unit, or member, and a female unit or member, and considering the invention more broadly, it is practiced in a complete brake system for a multi-unit vehicle or rail train. The male member is rigidly secured to the tractor and connected to the brake thereof in a tractor-trailer combination, for instance, while the female member is connected to the braking system in the trailer. The female member fits over the male member and when in operating position is locked against movement relative thereto by a locking pin. The male unit has a plunger therein which is operated by the brake lever in the tractor. This plunger is in operative engagement with a similar plunger in the female member so that as the plunger in the male member is moved by the application of the brake in the tractor, the plunger in the female member will be moved to apply the brakes in the trailer unit. When the trailer is uncoupled from the tractor on purpose or accidentally the locking pin is released, and the female member is pulled away with the trailer from connection with the male member. Upon separation of the two portions of the coupling the brakes in the trailer are automatically applied by reason of a spring action on a piston in the female member. When the brakes are thus applied in the trailer they will hold the trailer in a stopped position for an indefinite period of time. A hand lever on the female member is provided so that the spring action, which actuated the plunger therein upon uncoupling, may be released when coupling the members or units together again so that the female member may be fit over the male member to put them in operative connection again.

Referring now to the drawings, I provide a brake coupling comprising substantially two main elements, a male member 11, and a female member 12. The male member 11 is rigidly secured to the front unit, such as the tractor, or engine, of a multiple unit train, by bolts 13 or the like.

If there are more than two units in the train a male member is mounted on the rear of each unit inasmuch as complete brake coupling between any two units requires a male member on the pulling unit and a female member on the following unit. Although I have not shown the diagram of the fluid line for a hydraulic braking system, it will be understood by those familiar with the art that a series of fluid tubes are connected intermediate a master brake fluid cylinder and each wheel to which braking pressure will be applied on each unit of the train. The embodiment of the male member of my coupling as shown in Figs. 1 and 5 is connected directly into the system of tubes for the ordinary hydraulic brake system through a tube or hose 14, which is threadably secured in a hole 16 (Fig. 5) in the casing 17 of the male member. A longitudinally extending cavity 18 formed in the casting process of the male member is open at one end to allow operative engagement between male and female member, as will be hereinafter explained, and is closed at the other. The hole 16 is bored into the casing 17 so as to contact the cavity 18 near the closed end. The normally extended spiral spring 19 is positioned in the closed end of the cavity 18 and extends outwardly therefrom. The extended end of the spring 19 is capped by a metal member 21, the diameter of which is substantially equal to that of the cavity 18. The cap 21 is provided as a guide for the extended end of the spring 19 so that said end will not fall to the bottom of the cavity 18. Abutting the metal cap 21 is a rubber disc 22 which in turn abuts a plunger 23. So that the plunger 23 may be guided in a straight line movement, it is provided with a pair of guide plates 24 substantially equal in diameter to that of the cavity 18. The rubber disc 22 acts as a sealing member to keep the braking fluid behind the disc, or to the left as viewed in Fig. 5. When this hydraulic male member is used in a high pressure braking system such as that used for railroad trains or the like, a precision-ground piston is used in place of the combination of the plunger 23 and rubber disc 22. Upon application of the brakes, the braking fluid will be forced from the master cylinder through the tube 14 into the cavity 18 thus forcing the piston 23 to the right, as viewed in Fig. 5. Fig. 5 shows the piston 23 in the position it would take when the male member and the female member are coupled and in operative position, but the brake is released. Since the spring 19 tends to push outwardly on the plunger 23 at all times, a stop portion 25 is provided in the cavity 18 of the male member to limit such movement when the two members are uncoupled.

The female member 12 illustrated in detail in Fig. 2, has a cavity 26 therein which is open at one end so that the female member may be fitted over the male member. The inner diameter of the cavity 26 is only slightly larger than the outer diameter of the male member so as to provide a reasonably close fit therewith. As the female member is positioned over the male member, the male member rests against a shoulder 27 at the inner end of the cavity 26. When the two members are in this coupled position, a locking pin 28 (Figs. 3 and 4), pivotally mounted on the casing of the female member 12 projects through the hole 29 in the female casing and into the hole 31 of the male casing so as to lock the female member against movement relative to the male member. Pivotally connected to an ear on the pin 28 is a rod 30 which is slidably supported in a projection on the casing of the female member and extends in back of a brake fluid cylinder as viewed in Fig. 2, and as will be hereinafter described. In order to retain the pin 28 in locking position while the male and female members are coupled, a normally extended spring 32 is carried on the rod 30 intermediate the casing projection and a washer rigidly secured to said rod.

The female member of my coupler is constructed so that upon uncoupling of the male and female members, the mechanism of the female member will be automatically actuated to apply the brakes to which the female member is connected as on a trailer. This actuating mechanism includes a spring 33 mounted on a rod 34 intermediate a nut 36 and the projection 37 of the casing on the female member. The rod 34 is pivotally linked to an external arm 38 (Figs. 1 and 3), which is rigidly secured to an arm 39. The arm 38 extends around the outside of the casing of the female member and the arm 39, which is pivotally mounted to the casing of the female member at the stub 40, extends into the inside of the female member and into the cavity 26 therein. The arm 39 is slidably connected by the stub projection 41 to a peg 42 as will be hereinafter explained. Pivotally linking one end of the arm 39 to the casing of the female member is a straight link 43, and an inverted V-shaped link 44 pivotally connected thereto. The link 44 is provided with a leg 46, and when the two members are in coupled position, the leg 46 extends through an opening 47 in the casing of the female unit and rests on the outside of the casing 17 of the male unit. The female member is shown in coupled position in Fig. 2, although the male member is not actually positioned in the cavity 26. As the two members are uncoupled, the spring 33 will drive the rod 34 to the right as viewed in Fig. 2, pivoting the arm 39 in a counterclockwise direction by means of the arm 38, and the leg 46 of the link 44 is pivoted into the cavity 26, thus making it impossible to recouple the two members until the leg 46 is removed. A hand lever 48 (Fig. 1) is pivotally mounted on the casing of the female unit and linked to the rod 34 at one end 49 to move the rod and pivot the leg 46 of the link 44 out of the cavity 26 so that the two members may again be coupled.

The outside mechanism on the female member is connected to the inside brake-actuating mechanism by means of the peg 42 which drives the inside mechanism and operates the brakes on the trailer, both when the two members are coupled, as well as uncoupled. When coupled, the end of the peg 42 lays in the cavity 50 of the plunger 23 of the male member and in the coupling operation moves the plunger 23 of the male member to the left from the stop portion 25 to the position shown in Fig. 5. The peg 42 is bifurcated at one end and provided with a pair of identical legs 51 straddling the arm 39 while the pin 41 is slidably carried in corresponding slots 52 in the legs. When the two members are in coupled operative position and the brakes are released, the arm 39 rests against the right end (as viewed in Fig. 2) of the slots 52 in the peg 42. In this position the plunger 23 is urged against the end of the peg by the spring 19 under compression.

More particularly as to the fluid carrying portions of the female member, the peg 42 is rigidly secured in a cavity 53 in a piston or plunger 54 slidably carried in a cylinder 56 at one end of the female member. The inside diameter of the cylinder 56 is smaller than the inside diameter of the cavity 26 so that the annular shoulder 27 for receiving the end of the male member 11 is provided. The plunger 54 is limited in its movement to the left as viewed in Fig. 2 by means of a ring 57 snapped into an annular groove 58 in the cylinder 56. Excess brake fluid is stored in a tank 59 integral with the casing or housing for the female member and provided with a removable but fluid-tight cover 61 for cleaning the tank as desired. The volume of fluid in the tank 59 varies in accordance with the position and operation of the brakes in operative connection with the plunger 56 and in order that the air in the tank 59 may be equalized with the variation volume of brake fluid, an ordinary air vent 62 is provided in the cover of the tank.

The plunger structure 54 includes a pair of side plates 63 at opposite ends thereof to slidably engage the inside of the cylinder 56 and maintain the plunger in the proper alignment therein. Yieldable sealing discs 64 and 64' are provided at opposite ends of the plunger to prevent the brake fluid from leaking from the cylinder 56 so that there will be no loss of brake fluid during the operation of the complete coupled brake system nor from the female member when it becomes uncoupled from the male member of the complete system. As previously explained, when using my invention with a high pressure braking system such as on high speed trains and the like, the plunger structure 54 just described may desirably be replaced by a precision ground piston operating in the cylinder 56. The tank 59 is connected with the cylinder 56 by means of a pair of ports 66 and 65 extending through the cylinder wall in positions such that the brake fluid may pass to and from the tank 59 to the cylinder 56 through one port or the other depending upon the position of the plunger and the two sealing discs 64. The hydraulic braking system on the trailer or following unit to which the female member is connected, is connected with the cylinder 56 by flexible hose or tubing 67 having a threaded nipple on the end for threadable connection with an aperture 68 in the end of the cylinder. The cylinder is closed at that end or opened depending upon the operation of the plunger by means of an inlet valve 72 and a cooperating outlet valve 73 which is under pressure from spring 74 mounted on the neck 76 of the valve and acting to close such outlet valve 73 when there is substantially no outward fluid pressure thereon. Intermediate the inlet valve 72, and the sealing disc 64' at the right-hand end of the plunger as viewed in Fig. 2, is a spring 77 capped by a metal member 78 on the end adjacent the sealing disc. The spring 77 is normally under some compression and assists in holding the plunger 54 at the left-hand end of the cylinder in the position shown in Fig. 2, or when the plunger is moved to the right for operating the brakes on the trailer unit B, the spring 77 maintains the inlet valve 72 against the end of the cylinder 56.

Either before or after the pulling unit A, as a tractor, is coupled in any desired manner to a following unit B, as a trailer, in a multi-unit train, the female member 12 secured to the flexible hose 67 is inserted over the stationary male member 11 in a telescoping connection. Previous to this coupling the hand lever 48 is pivoted upwardly to the position shown in Fig. 1 to retract the rod 34 and pivot the leg 46 of the link 44 out of the aperture 47 so that the extended housing 17 could be inserted into the cavity 26 until the mouth of the housing engages the shoulder 27. In this position the plunger 23 is in engagement with the end of the peg 42, and the locking pin 28 is in locking engagement with the male member at the aperture 31. With the hose or tube 14 connected into the hydraulic brake system on the unit A, brake fluid passes through the tube to the cavity or cylinder 16 when the usual foot or hand operated element in the unit A is actuated. The fluid is forced against the back or lefthand end of the plunger 23 (Fig. 5) and this is moved outwardly as heretofore mentioned. This movement is transmitted through the peg 42 to the plunger 54 of the female member, to move this plunger against the action of the spring 77. Since the arm 39 cannot move when the male and female members are coupled by reason of the V-shaped link 44 contacting the male member, the peg 42 and plunger 54 will move independently of the arm within the limits of length of the slots 52, which length corresponds in general to the distance between the stop 25 on the male member housing and the plate 24 on the plunger 23 in its position of rest. As the plunger 54 is moved to the right, as viewed in Fig. 2, the disc 64' will immediately cut off the port 65 into the fluid tank 59, so that the only possible outlet for the fluid to the right of the disc 64' in the cylinder 56 will be through the outlet valve 74 and thence to the brake units in the trailer thereby applying said brakes. As the brake control lever or pedal in the tractor is released, the plunger 54 will be movd back to th position shown in Fig. 2 by the action of the spring 77. As the spring pressure on the inlet valve 72 is lessened, the fluid pressure on the opposite side will become relatively greater so as to force the valve 72 open and admit the brake fluid back into the portion of the cylinder 56 to the right of the disc 64'. If air should get into the cylinder 56 through some faulty connection thereby rendering the brakes partially inoperative, the brake control lever or pedal may be pushed down and released several times to pump more fluid through the ports 60 and 65 and into the compression chamber portion of the cylinder 56, or in other words, to the right of the plunger 54. This is accomplished to some extent every time the brake control lever is released and the plunger 54 is moved to such a position as to allow fluid to be admitted into the compression chamber of the cylinder 56 through the hole 65 from the fluid tank 59.

A cable C is connected to the locking pin rod 30 at one end and at the other end is secured to the brake joint 69 on the trailer or directly to the trailer. The cable C is shorter than the flexible hose 67 and when the trailer and tractor become uncoupled through accident or otherwise so that one unit will pull away from the other unit, the cable C will become taut thereby pulling on the rod 30 and releasing the locking pin 28. Upon the release of the locking pin 28 the male and female members will be separated and the female member will fall down before the hose 67 is stretched so that the hose is not broken or damaged. A spring S contracts and prevents the female member from falling to the pavement. As the female unit is pulled away from the male unit, the leg 46 of the V-shaped link will no longer be supported on the male member and the arm 39 will be pivoted under pressure of the spring 33 which is released. The arm 39 will drive the pin 41 against the right end of the slot 52, thereby driving the plunger 54 to in turn transmit brake fluid to the brake units of the trailer bringing the trailer to a stop. This is extremely advantageous if the trailer is in motion at the time it is uncoupled from the tractor, since it will not only stop the trailer and possibly avoid considerable damage as can be understood, but the force of the spring 33 will act to retain the brakes in applied position to hold the trailer for an indefinite period of time.

The required braking power on a trailer varies in accordance with the load capacity of the unit. The braking power to be applied automatically when a tractor and a trailer become uncoupled may be increased in my system by the use of a relatively heavy spring 33. Greater leverage on the plunger 54 may also be provided by lengthening the outside arm 38, and increasing the length of the outer portion of the arm 39 extending from the pivot point 40 outwardly to the end.

Fig. 6 shows a modification of the male member of my invention. This embodiment is similar to the one shown in Fig. 5 except that the male member in Fig. 6 is employed for a vacuum, or mechanical braking system, as will be hereinafter explained. A longitudinal cavity or bore 79 is provided which may extend entirely through the male member and a plunger 81 is slidable therein. As explained with reference to Fig. 5, the male member fits into the female member and contacts the peg 42 thereof at the slight depression 82 in the end of the plunger 81. A link 83 is pivotally connected at one end to the plunger 81 and at the other end to the arm 84, which is pivoted on the stub shaft 86. By pivoting the arm 84 in a counterclockwise direction on the shaft 86, the plunger 81 is moved to the left, as viewed in Fig. 6. When the arm 83 is operatively connected to a vacuum or mechanical braking system through the connecting rod 87, pivotally connected to the bottom of the arm 84, the plunger 81 may be moved to the left when the brakes are applied through the master control unit of either the mechanical or vacuum braking system. Such a movement of the plunger 81 will move the plunger such as 54 in a corresponding female member thereby applying the brakes in the system on a trailer or following unit to which the female member is connected.

Figure 9:
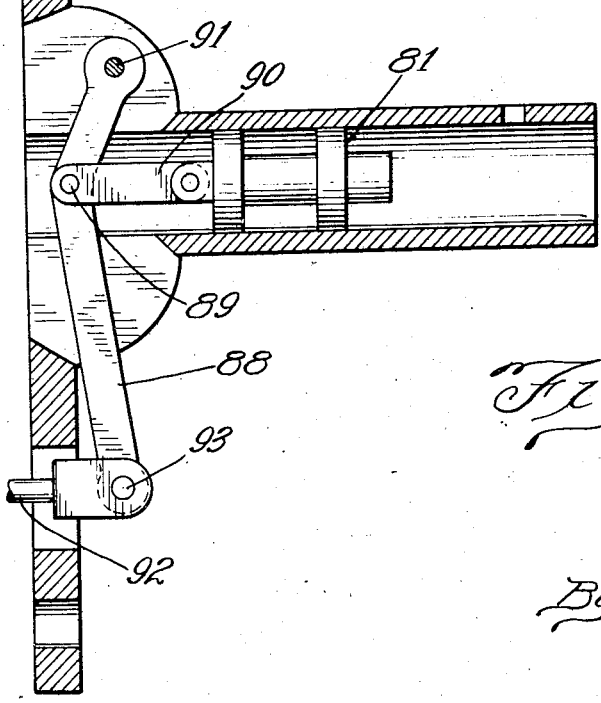
Fig. 9 is a longitudinal sectional view of a further modification of the male member of the structure in Fig. 1.

A second modification of the male member as shown in Fig. 9 may be used on the pulling unit when such unit is provided with an air braking system. The casing and plunger are similar to the structure shown in Fig. 6, except that the arm 88 is operatively connected to the plunger at the point 89 intermediate its ends and is itself pivotally mounted on the stationary stud 91. A link 90 is pivotally connected at one end to the arm 88 and at the other end to the plunger 81. The master control chamber for the air braking system on the pulling unit of the train is connected to the arm 88 through the rod 92 which is pivotally connected to the stud 93 on the lower end of the arm 88. As the brakes are applied in the unit to which this member is connected, the arm 88 will be pivoted so as to force the lower end to the right, as viewed in Fig. 9, thereby forcing the plunger to the right and operating a female member as shown in Fig. 2 which is coupled to this male member, as heretofore explained. The male members of Figs. 5, 6 and 9, can also be coupled to the female member illustrated in Fig. 7 as will be explained.

The female member shown in Fig. 7 is used on the following unit of a multiple-unit train when such unit is provided with a mechanical braking system. The casing of this member is formed so as to provide a cavity 94 therein which is open at one end to admit the male member, as previously described with reference to Fig. 2. When the male and female members are inoperative coupled position, the locking pin 96, which is pivotally connected to the casing of the female member, projects through the hole 97 in the female member and into a hole in the casing of the male member, as the hole 31 (Fig. 5) or the corresponding holes in the embodiments of Figs. 6 and 9. This will lock the two members in operative position, with the spring 98 acting on the rod 99 connected with the locking pin.

Figure 8:
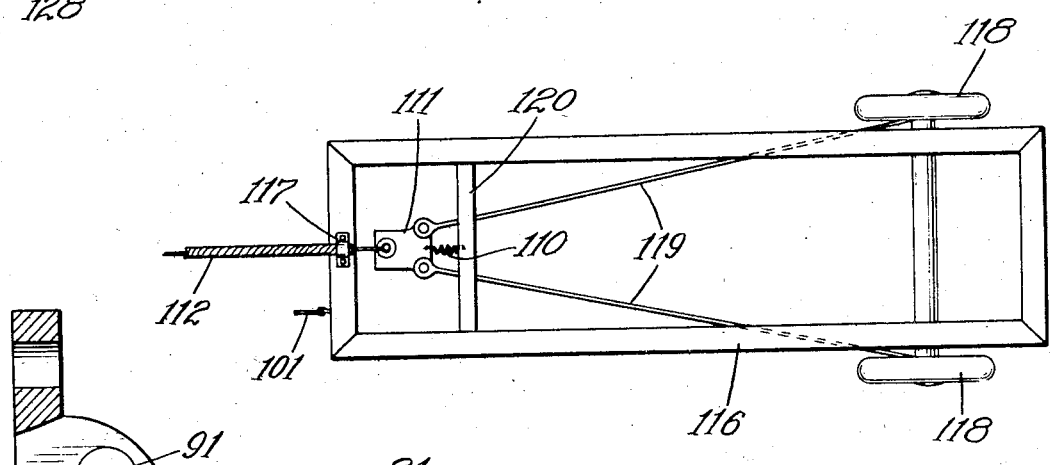
Fig. 8 is an illustration somewhat diagrammatically, of a mechanical brake system on a trailer.

The wall portion 102 in the female member acts as an abutting wall for the end of the male member and has a hole 103 through which a rod 104 passes to be guidably supported therein. One end 106 of the rod 104 is pivotally connected to an arm 107 which is pivoted on a casing stud 108. In order to allow for a slight movement of the rod 104 away from a single longitudinal plane as a result of the arcuate path of pivotal connection between the rod and the arm 107, the hole 103 is made slightly larger than the diameter of the rod. This movement of the rod 104 away from a straight line is only very slight, however, inasmuch as the pivotal movement of the arm 107 to operate the brake of the associated brake system is not great. The brake system on a trailer unit, for instance, is connected to the female member by a flexible cable 109, pivotally connected at one end to the lower end of the arm 107 and at the other end to a coupling plate 111 (Fig. 8). The cable 109 is covered by a sheath 112 which is rigidly secured in a cavity 113 in the female member by the bolt 114 and likewise rigidly secured to the trailer frame 116 by the clamp 117. The cable 109 and its sheath 112 are longer than the cable 101 so that there will be slack in the former to provide operation of the locking pin and uncoupling of the female member and its associated male member before a pull is exerted on the cable and sheath upon separation of a tractor and trailer combination. This has been previously explained with reference to the principal embodiment. The sheath 112 is constructed so that there will be flexibility over its length but substantially no contraction or expansion, which if present might introduce lost motion in the cable 109 when applying the brakes and hence interfere with a prompt and efficient application of the power from the brake lever or pedal in the pulling unit.

When the braking system to which the male member is connected is operated so as to apply the brakes, the rod 104, which is in contact with a plunger in the male member, will be forced to the right, as viewed in Fig. 7. This movement of the rod will pivot the arm 107 so as to pull the coupling plate 111 to the left, as viewed in Fig. 8, thereby applying the brakes in the wheels 118 through connecting rods 119 connected to the coupling plate 111. In order to maintain the arm 104 in contact with the plunger in the male member when the two members are coupled, a normally contracted spring 110 is provided intermediate the coupling plate 111 and a crossbar 120 on the frame 116 of the trailer. Fig. 8 shows a two-wheel unit, but it is understood that the female member of Fig. 7, and likewise, of course, of Fig. 2, may be adapted for use on a four-wheel unit braking system.

The female member of Fig. 7 acts to automatically apply the braking system illustrated somewhat diagrammatically in Fig. 8, whenever the two units of a train become uncoupled, either when done purposely or when the uncoupling occurs accidentally. The automatic operation is accomplished by mechanism similar to that employed in the structure of Figs. 1 and 2 which includes a rod 121 pivotally connected at one end to the arm 107 and guided intermediate its ends by an apertured extension 122 on the housing for the female member. The rod 121 is driven, to in turn pivot the arm 107 and pull the cable 109 for the braking system, by means of a spring 123 supported on said rod and retained between the wall of extension 122 and a washer and collar unit 124 on the rod. A slot 126 in the end of the rod 121 connected to the arm 107, permits pivotal movement of the arm when the cable 109 and associated brake system is operated independently of the spring 123.

The rod 121 is split at its outer end and provided with a pair of identical legs 127 which straddle an L-shaped lever 128 in engagement with the rod at the termination of the slot formed therein by the two legs. The lever is pivoted substantially at the end of the female member. This position can be moved to the right if the configuration of the coupled male member is such that it abuts against the outer end of the cavity 94. As illustrated in Fig. 7 the female member is in a coupled position so far as its various elements are concerned, and the spring 123 is in a compressed position for automatic operation upon the uncoupling of the female member and an associated male member. In the interest of clarity in the drawings the male member is not illustrated in coupled position with the female member. The lever 128 is pivotally supported from a bracket 129 integral with the housing for the female member. In the position of Fig. 7 the tip 131 of the lever bears against the housing on the male member, so that such lever cannot pivot in a clockwise direction. As soon as the female member and its associated male member are uncoupled, the force of the compressed spring 123 acting on the lever 128 will pivot it clockwise and upwardly, with the spring at the same time extending to pull the cable 109 therewith to apply brakes on the trailer. The lever 128 can be pivoted in a counterclockwise direction manually before the female member and the male member are coupled, or this pivotal movement can in the main be accomplished coincident with the coupling of the two members, as can be readily understood.

The pivoted leg 46, and the lever 128, by virtue of extending inwardly past the mouth of their corresponding cavities, both act to prevent their respective female members or connectors from being coupled with a male member until the automatically acting spring release is set. In this manner, if a male member and a female member are coupled the operator is assured that the springs 33 and 123 are also cocked or set so that each will operate the brakes on the following unit if the pulling and following units become uncoupled.

My invention provides, therefore, simple, sturdy apparatus for coupling two entirely independent brake systems together on different units of a multi-unit train. The coupling of the brake systems is normally accomplished independently of the coupling of the train units. Such a train is considered to include a tractor and trailer combination or a tractor with several trailers in combination, and it also includes two or more units in a railway train such as an engine and one or more cars being coupled together and pulled by such engine. My coupling apparatus makes it possible to connect together two similar, or two entirely dissimilar types of brake systems on the different train units and provide positive, efficient operation under all conditions. In addition, assuming that it would be possible to operate a pulling unit without brakes on such unit, the structure of my invention could also be employed to operate from the pulling unit as well as automatically, the brake system on the following unit. Furthermore, not only is my system entirely effective for accomplishing an ordinary braking operation with the various units of a train in coupled position, but of greater importance, my system provides for the automatic operation of a brake system on a following unit in a multi-unit train when the following unit is uncoupled from the pulling unit preceding the same in the train. Because of the construction of the male and female members they pull directly away from one another in uncoupling, making such uncoupling as simple and rapid as possible with a minimum possibility of the mechanism jamming and remaining together. This structure and operation insures against run-a-way trailers which have caused serious damage in the past, and acts in a similar manner in the event that cars in a train become uncoupled.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. In a multi-unit train including a pulling unit and a following unit with a braking system on the following unit and means on the pulling unit for operating a braking system, means for connecting the brake operating means of the pulling unit with the braking system of the following unit including a pair of coupler members, automatically releasable locking means for holding said coupler members in operative engagement, each of said coupler members being connected to a corresponding one of said units, with the member connected to the following unit including a cavity extending substantially longitudinally therein, a substantially longitudinally moving member in said cavity, means operatively connected with said longitudinally moving member for automatically driving said moving member on operation of said releasable locking means to uncouple said coupling members, and means extending from said coupler member connected to said following unit for operative connection with the brakes thereon to apply such brakes upon the movement of said longitudinally moving member in one direction.

2. In a train combination including a pulling unit and a following unit normally coupled together with said folllowing unit having a brake system thereon, and said pulling unit having brake actuating means thereon, coupler means for coupling together said two means including a connector member on each of said units, with the connector member on the following unit including a spring driven member operatively connected to the brake system of the following unit, pivoted means on the following unit connector member acting on the spring driven means to retain the same under spring compression when the two connector members are in coupled relation, and being pivotally movable to a position on the following unit connector member to prevent coupling of said connector members after the spring driven member has been released to operate the braking system on the following unit, the brake system of said following unit being applied until a reengagement of said coupling members is effected by a resetting of said pivoted means.

3. Coupling means for coupling together two normally independent braking systems including a first coupler member operatively connected to one of said braking systems and having a lateral extension thereon, and a second coupler member operatively connected to the other of said braking systems having a cavity therein for receiving the lateral extension of said first coupler member, a movable plunger in said cavity, a movable plunger mounted on said member outside of said cavity, means operatively connecting each of said plungers with said other braking system and yet permitting the movement of one of said plungers independently of the other, spring means on said outside plunger for driving the same, and means preventing the spring from driving said outside plunger upon the coupling together of said two coupler members with the extension of said first coupler member in the cavity of said second coupler member, said means being automatically operable upon separation of said coupler members to permit the driving of said outside plunger by said spring whereby to operate said other braking system independently of the operation of said first braking system.

4. In a train combination including a pulling unit and a following unit for coupling together and each of said units having a brake system thereon, a coupling member on the following unit operatively connected with the brake system on said unit having a substantially cylindrical portion therein, substantially longitudinally moving means in said cylinder operatively connected with the brake system on said following unit, a coupling member on the pulling unit operatively connected with the brake system thereon and operatively connected with said moving means for actuating the brake system on the following unit upon actuation of the brake system on the pulling unit, and spring pressed means operatively connected with said moving means adapted to be operated automatically upon separation of the said coupling members to drive said longitudinally moving means to apply the brake system of the following unit independently of the actuation of the brake system of the pulling unit.

5. In a train combination including a pulling unit and a following unit normally coupled together and each of said units having a brake system thereon, coupler means on the following unit including a housing with a longitudinal cavity therein, a movable plunger in said cavity, a movable member on the outside of said housing, connecting means pivotally mounted on said housing and pivotally connected with corresponding ends of said plunger and said member respectively, with the connection between said connecting means and said member being such as to permit movement of said member independently of said plunger, and link means operatively connected to said plunger and said member for operative connection to the brake system on said following unit, coupler means on the pulling unit operatively connected with the brake system thereon and operatively connected with said plunger for actuating the brake system on the following unit upon actuation of the brake system on the pulling unit, and spring means on said movable member for driving said movable member to actuate the following unit brake system independently of the actuation of the brake system on the pulling unit, upon the uncoupling of said coupling means.

6. A coupling for two normally independent braking systems including a male member and a female member with each member operatively connected to a corresponding braking system, brake actuating means on said female member and automatic means thereon to operate said actuating means upon separation of the female member from the male member, said automatic means including an arm pivotally mounted on said female member and operatively connected with said actuating means, a link operatively connected with said arm, movable upon movement of said arm and retained against movement by contact with said male member when said members are coupled but adapted to move when said members are uncoupled, and spring means connected to said arm to pivot the same and operate the brake actuating means when said link is moved upon said uncoupling.

7. Coupling means for coupling together two normally independent braking systems, including a first coupler member operatively connected to one of said braking systems having a body portion and a lateral extension integral therewith, said lateral extension having a longitudinal cavity therein and a plunger slidably mounted in said cavity, means for driving said plunger upon actuation of said one braking system including an arm pivotally mounted intermediate its end on said body portion, pivotally connected to said plunger at one end, and connecting means pivotally connected to the other end thereof for operative connection with said one braking system, and a second coupler member operatively connected to the other of said braking systems having means thereon for operative connection with said plunger upon the coupling of said two coupler members.

8. Coupling means for coupling together two normally independent braking systems, including a first coupler member operatively connected to one of said braking systems having a body portion and a lateral extension integral therewith, said lateral extension having a longitudinal cavity therein and a plunger slidably mounted in said cavity, means for driving said plunger upon actuation of said one braking system including an arm pivotally mounted at one end on said body portion, pivotally connected intermediate its ends to said plunger, and connecting means pivotally connected to the other end thereof for operative connection with said one braking system, and a second coupler member operatively connected to the other of said braking systems having means thereon for operative connection with said plunger upon the coupling of said two coupler members.

9. In a train combination including a pulling unit and a following unit for coupling together, and each of said units having a brake system thereon, a female member on the following unit including a housing with a pair of cavities coextensive therein, piston means in one of said cavities, driving means for said piston means secured thereto and extending into the other of said cavities, spring means on said housing outside of said cavities operatively connected with said driving means, a male member on said pulling unit including a body portion with a lateral extension thereon, said lateral extension having a longitudinal cavity therein, piston means in said cavity operatively connected with the brake system on said pulling unit and adapted to be driven upon actuation of said pulling-unit-brake system, with said lateral extension fitting into said other of said cavities in the female member for coupling thereto, and with said piston means being in operative connection with said driving means upon said coupling of said male member and said female member, means for releasably locking said male member and said female member together and acting upon the separation of the pulling unit and the following unit to permit the uncoupling of said male member and said female member, and means for preventing the actuation of said spring means upon the uncoupling of said male member and said female member.

10. In a train combination including a tractor unit and a trailer unit normally coupled together and each of said units having a brake system thereon provided with independent hydraulic systems, means for coupling together the brake systems of said two units in a manner such that the brake system on the trailer unit will be operated upon operation of the brake system in the tractor unit, said means including a pair of coupler members each of which is operatively connected to a corresponding one of said brake systems, means on said trailer coupler member for separably locking said members together in coupled position, and spring pressed means supported on said trailer coupler member and connected with said locking means, said spring pressed means being adapted upon release thereof, to actuate the brake system of the trailer unit independently of the operation of the vehicle brake system, and said locking means, upon separation of said units, being automatically operable to uncouple said members and to release said spring pressed means.

11. In a train combination including a tractor unit and a trailer unit normally coupled together and each of said units having a brake system thereon provided with independent hydraulic systems, means for coupling together the brake systems of said two units in a manner such that the brake system on the trailer unit will be operated upon operation of the brake system in the tractor unit, said means including a pair of coupler members each of which is operatively connected to a corresponding one of said brake systems, locking means on said trailer coupler member for releasably locking said members together in coupled position, and spring pressed means operable to apply the brake system of the trailer unit independently of the actuation of the vehicle brake system, said locking means upon separation of the units, being operable to uncouple said members and to actuate said spring pressed means, the trailer brake system remaining applied until said coupling members are coupled together and locked by said locking means.

12. In a train combination including a pulling unit and a following unit normally coupled together and each of said units having a hydraulic brake system thereon, a coupling means including a male member on the pulling unit and a female unit on the following unit, said members being in operative but separable engagement, an expansible fluid chamber in each of said members connected to a corresponding brake system, means for increasing simultaneously the fluid pressures in said chambers whereby to concurrently apply said brake systems, a fluid reservoir supported on said female member, fluid ports connecting said reservoir with said female fluid chamber to supply fluid thereto when the said female fluid chamber is in an expanded condition, and means for automatically uncoupling said members upon separation of said units.

HANS F. KOLB.